United States Patent Office 2,888,472
Patented May 26, 1959

2,888,472

PREPARATION OF Δ¹-DEHYDROCORTISONE

Georges Muller, Nogent-sur-Marne, Robert Joly, Montmorency, and Roland Bardoneschi, Tremblay-les-Gonesse, France, assignors to Les Laboratoires Français de Chimiothérapie, Paris, France, a French body corporate No Drawing. Application April 10, 1956
Serial No. 577,208

Claims priority, application France April 15, 1955

6 Claims. (Cl. 260—397.45)

The present invention relates to new methods of preparing Δ¹,⁴-pregnadiene 17α,21-diol 3,11,20-trione (also designated as Δ¹-dehydrocortisone or metacortandracine) and to a new intermediate obtained in the course of preparing said compound.

Two new corticosteroids, namely Δ¹,⁴-pregnadiene 11β, 17α,21-triol 3,20-dione (also designated as Δ¹-dehydrocortisol or metacortandranolone) and the aforementioned Δ¹-dehydrocortisone have attained importance as therapeutic agents because of their pronounced antiarthritic effects.

One method of preparing Δ¹-dehydrocortisone acetate (or metacortandracine acetate) according to the present invention utilizes 4-bromo 17α-hydroxy 21-acetoxy pregnane 3,11,20-trione (see structural formula I).

However, instead of employing 4-bromo 17α-hydroxy 21-acetoxy pregnane 3,11,20-trione as starting material, it is also possible to use a derivative thereof that has not been brominated, as yet, namely 17α-hydroxy 21-acetoxy pregnane 3,11,20-trione (II), or even a still prior intermediate, viz. 3α,17α-dihydroxy 21-acetoxy pregnane 11, 20-dione (III).

The herein claimed processes comprise converting either one of the derivatives of Formulas I, II and III of the following reaction diagram into a 2,4-dibromo 17α-hydroxy 21-acetoxy pregnane 3,11,20-trione, a product of Formula IV, characterized by levorotatory action, followed by debromination and conversion into Δ¹-dehydrocortisone (or metacortandracin) acetate, for example, with the aid of a tertiary base such as collidine or by means of dinitrophenyl hydrazone. In other words, the herein claimed cortisone synthesis permits the preparation of Δ¹-dehydrocortisone by means of forming a new intermediate having a second, stereo-active bromine attached in the 2-position. This new synthesis tends to greatly reduce the production cost of Δ¹-dehydrocortisone.

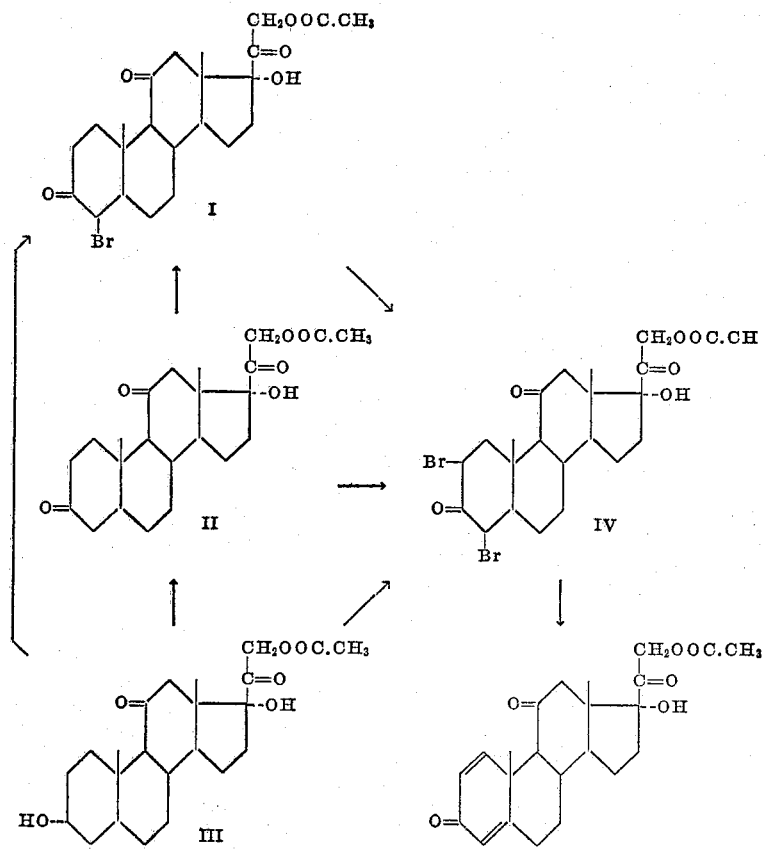

It is the principal object of the present invention to provide new, relatively simple and economic methods of preparing Δ¹-dehydrocortisone at substantially high yields.

It is another object of the invention to produce 2,4-dibromo 17α-hydroxy 21-acetoxy pregnane 3,11,20-trione as a valuable new intermediate.

These and other objects and advantages of the invention will become more obvious from the herein-following detailed description of the invention.

Attempts to brominate compound I in the 2-position in the usual manner results in a fixation of the second halogen on carbon 4, on carbon 2 in α or β position, or on carbon 21. The result are resinous or gummy mixtures that, as a rule, are uncrystallizable. Although the bromine content may correspond with the theoretical value, it is impossible to isolate, by fractional or chromatographic crystallization, any appreciable amount of the dibrominated derivative IV. This is the case when operating in the usual media, such as acetic acid, chlorinated solvents, tertiary butyl alcohol, isopropylic ether or ether, as will be demonstrated by means of several of the subsequent examples. Only when operating in methanol is it sometimes possible to separate a very small amount of the crystallized product.

We have discovered that the bromination proceeds in the desired direction, resulting in high yields of the crystallized, levorotatory 2,4-dibrominated derivative (IV) if the process is carried out in dioxane. This was not at all predictable, since it cannot be accomplished with any other of the aliphatic or cyclic ether-oxides. The yield is close to or even in excess of 55%, resulting in a product characterized by a specific rotation of about $-10°$.

Upon treating the mother liquor remaining after crystallization of the foregoing product with zinc powder, debromination takes place and compound II is recovered, which can be utilized, either for the preparation of compound I which may serve for the preparation of cortisone according to Gallagher's method, or for the preparation of derivative IV as previously set forth.

Thus, compound II may be directly converted into compound IV by dibromination in dioxane. Moreover, the operation may be carried out by starting with compound III and converting it into compound I, according to the process described in U.S. patent application Serial No. 360,878, of June 11, 1953, now U.S. Patent No. 2,768,189, assigned to the assignee of this application, by the action of N-bromo-succinimide in the presence of an oxidizable alcohol and water, whereupon the necessary amount of bromine is directly added to the reaction mixture, in the presence of dioxane, and without isolating compound I. Finally, the addition of bromine can be omitted in this last case by adding N-bromo-succinimide in the presence of hydrobromic acid, always using dioxane as the reaction medium.

The following examples are provided to show both the failures encountered with other solvents than dioxane and the measures taken to obtain the desired result, without, however, limiting thereby the scope of the invention.

EXAMPLE 1

*Bromination of 4-bromo 17α-hydroxy 21-acetoxy pregnane 3,11,20-trione (I) in acetic acid*

483 mg. of compound I melting at 250° C.; $[\alpha]_D^{20}=+112°$ (c.=0.5%, acetone) are dissolved in 10 cc. of acetic acid while stirring and heating to 40° C. Bromination is carried out by adding 2.1 cc. of acetic acid containing 8% of bromine (or 1.05 mols of bromine). After precipitating by means of adding water, separating, desiccating, washing with water and drying, an amorphous and uncrystallizable product is obtained; $[\alpha]_D^{20}=+40°$ (c.=1%, acetone).

EXAMPLE 2

*Bromination of 4-bromo 17α-hydroxy 21-acetoxy pregnane 3,11,20-trione (I) in chloroform*

500 mg. of compound I are dissolved in 35 cc. of chloroform. After distilling off 5 cc. of the solvent in order to eliminate any trace of water, the solution is cooled and brominated with 2.75 cc. of chloroform containing 7% of bromine (or 1.15 mols of bromine), the addition of the bromine solution being carried out slowly, at 40° C., within a period of 5 minutes. The solution is refluxed for twenty minutes, the solvent evaporated under vacuum, and the resinous residue dissolved in methanol. Part of the product crystallizes. Having been dried and washed in acetone, there remain 110 mg. of a product melting at 210° C.; $[\alpha]_D^{20}=+3°$ (c.=1%, acetone). Upon recrystallizing in aqueous acetone, it is possible to separate irregular amounts of the order of a few mg. of a product characterized by $[\alpha]_D^{20}=-10°$.

EXAMPLE 3

*Bromination of 4-bromo 17α,21-diacetoxy pregnane 3,11,20-trione in chloroform*

In order to prepare the 17-acetylated derivative of compound I, 2 g. of the latter are dissolved in 100 cc. of acetic acid while heating to 80° C. After cooling to 25° C. and adding 2 g. of monohydrated p-toluene sulfonic acid and 20 cc. of acetic anhydride, the solution is left standing for 16 hours at 20° C. The precipitate obtained upon pouring into water is dried, washed in water and dissolved in an excess of acetone; ether is then added until crystallization commences. The crystalline product is separated, washed with ether and dried. The result is 1.75 g. of a derivative of I, acetylated in the 17-position, M.P.=240° C.; $[\alpha]_D^{20}=+73°$ (c.=1%, acetone).

*Analysis.* — $C_{25}H_{33}O_7Br=525.4$.—Calculated: 57.1% C; 6.3% H; 21.3% O; 15.2% Br. Found: 57.4% C; 6.4% H; 21.6% O; 15.3% Br.

500 mg. of this compound are dissolved in 1 cc. of chloroform, 0.1 cc. of chloroform containing 7% bromine are added, and the solution is heated to 40° C. As soon as the reaction mixture has become decolorized, 1.7 cc. of chloroform containing 7% bromine are slowly added within a period of 30 seconds. The solution is refluxed for two minutes and is evaporated to dryness under vacuum. The crude product is dissolved in 1 cc. of methanol and is left standing in the refrigerator for several days, since crystallization is very slow. In this manner, 280 mg. of a product are recovered that melts at 180° C.; $[\alpha]_D^{20}=+10°$ (c.=1%, acetone). After two consecutive recrystallizations in aqueous acetone, the product yields 100 mg. of 2,4-dibromo 17α, 21-diacetoxy pregnane 3,11,20-trione, M.P.=210°, $[\alpha]_D^{20}=-30°$ (c.=1%, acetone). This product is unstable.

*Analysis.*—$C_{25}H_{32}O_7Br_2=604.4$.—Calculated: 49.7% C; 5.3% H; 26.5% Br. Found: 49.4% C; 5.5% H; 25.8% Br.

No better result is obtained if the heating is carried out in methanol instead of chloroform.

EXAMPLE 4

*Bromination of 17α-hydroxy 21-acetoxy pregnane 3,11,20-trione (II) in acetic acid*

404 mg. of compound II are dissolved in 40 cc. of acetic acid and the solution is treated at 20° C. with 5.25 cc. of an acetic acid solution containing 6.4% bromine (equal to 2.1 mols). Upon adding water, an amorphous substances precipitates which remains uncrystallizable, even if taken up in methanol. The specific rotation varies, from test to test, within $+40°$ to $+70°$ (c=0.5%, acetone).

If the bromination is carried out in acetic acid at a higher temperature (40° C.), a dibrominated compound is obtained which contains 27% of bromine, $[\alpha]_D^{20}=+55°$ (c.=0.5%, acetone). This product is likewise amorphous and cannot be crystallized. The same is true if the bromination is carried out in acetic acid in the presence of sodium acetate. The product, amorphous in each instance, has a specific rotation of $+50°$ (c.=0.5%, acetone).

EXAMPLE 5

*Bromination of 17α-hydroxy 21-acetoxy pregnane 3,11,20-trione (II) in chloroform*

404 mg. of compound II are dissolved in 20 cc. of chloroform and are treated at 20° C. with 2.1 cc. of chloroform containing 16% of bromine (2.1 mols). After washing with water and drying the solution over sodium sulfate, the solvent is eliminated by distillation under vacuum. The result is an uncrystallizable gummy residue, even after recovery from methanol.

EXAMPLE 6

Bromination of 17α-hydroxy 21-acetoxy pregnane 3,11,20-trione (II) in a dioxane-dimethylformamide mixture The resulting product is a resinous substance; $[\alpha]_D^{20} = +65°$ (c. = 0.5%, acetone).

EXAMPLE 7

Preparation of levorotatory 2,4-dibromo 17α-hydroxy 21-acetoxy pregnane 3,11,20-trione (IV) from 4-bromo 17α-hydroxy 21-acetoxy pregnane 3,11,20-trione (I)

10 g. of 4-bromo 17α-hydroxy 21-acetoxy pregnane 3,11,20-trione (I), M.P.=250° C.; $[\alpha]_D^{20} = +112° \pm 2°$ (c.=0.5%, acetone) are dissolved in 120 cc. of dioxane by means of heating. The mixture is cooled to 25° C. and to the solution are added 0.1 g. of hydrobromic acid in form of a solution of anhydrous hydrobromic acid in acetic acid, and then 3.5 g. of 10% bromine solution in acetic acid.

The absorption of bromine is instantaneous. Following this addition, 120 cc. of water are added, the resulting crystallized dibrominated derivative is dried, taken up in form of a paste with 10 cc. of 50% dioxane, washed in water and dried at 40° C. 6.4 g. of the desired product are obtained (equivalent to a yield of 55%); $[\alpha]_D^{20} = -10°$ to $-15°$ (c.=0.5%, acetone). The product contains 26 to 28% of bromine (theoretical: 28.4%). Upon recrystallization in aqueous acetone, pure 2,4-dibromo 17α-hydroxy 21-acetoxy pregnane 3,11,20-trione (IV) is obtained which is a new compound; $[\alpha]_D^{20} = -19°$ (c.=0.5%, acetone).

Analysis.—$C_{23}H_{30}O_6Br_2 = 562.31$.—Calculated: 49.12% C; 5.38% H; 28.43% Br. Found: 49.5% C; 5.5% H; 28.4% Br.

EXAMPLE 8

Preparation of 2,4-dibromo 17α-hydroxy 21-acetoxy pregnane 3,11,20-trione (IV) from 17α-hydroxy 21-acetoxy pregnane 3,11,20-trione (II)

10 g. of 17α-hydroxy 21-acetoxy pregnane 3,11,20-trione (II), M.P.=231° C., $[\alpha]_D^{20} = +80° \pm 2°$ (c.—1%, acetone), are dissolved at 20° C. in 250 cc. of dioxane. A mixture of 9.1 g. of pure bromine and 90 cc. of acetic acid is then added to this solution. The bromine is absorbed instantaneously. Upon adding 250 cc. of water, the dibromine derivative crystallizes. After stirring for one hour, the reaction mixture is filtrated and the residue made into a paste with 50% dioxane which is washed with water and dried at 40°. This procedure yields 7.3 g (52.5%) of a product; $[\alpha]_D^{20} = -10° \pm 2°$ (c.=0.5%, acetone), containing approximately 26.5% bromine (theoretically: 28.4%).

Upon recrystallizing in aqueous acetone, a pure product is obtained which is identical with that of Example 7.

EXAMPLE 9

Preparation of 2,4-dibromo 17α-hydroxy 21-acetoxy pregnane 3,11,20-trione (IV) from 3α,17α-dihydroxy 21-acetoxy pregnane 11,20-dione (III)

The following reaction mixture is heated to 60° C.:

| | |
|---|---|
| Compound III _____ g__ | 2 |
| Acetic acid _____ cc__ | 10 |
| Dioxane _____ cc__ | 5 |
| N-bromo succinimide _____ g__ | 1.84 |
| Distilled water _____ cc__ | 0.15 |

After twenty-five minutes, there is no longer any reaction discernible on moist amido-iodized paper. 25 cc. of dioxane are added, the solution is cooled to 25–30° C., and treated with 0.86 g. of bromine, dissolved in 2 cc. of acetic acid. As soon as all of the bromine has been absorbed, 3 cc. of water are added and the solution is stirred for about two hours at 5° C. Compound IV crystallizes slowly. It is separated, washed with aqueous dioxane, then with water, separated and dried under vacuum. The result is a crude compound IV, obtained at a yield of 25%. After recrystallization in aqueous acetone, a pure product is obtained, identical with that of Example 7.

The same result is attained if, instead of fixing the second bromine atom as indicated above, N-bromo succinimide is used instead of the free halogen. In this case, after having added 25 cc. of dioxane and having cooled the solution to 25° C., it is treated, first with 1 cc. of an acetic acid solution of dry hydrobromic acid (38.8 g. of hydrobromic acid per 100 cc.) and then with 0.9 g. of N-bromo succinimide. The bromination is instantaneous. After adding 30 cc. of water, purification is carried out as above.

EXAMPLE 10

Debromohydration of 2,4-dibromo 17α-hydroxy 21-acetoxy pregnane 3,11,20-trione (IV) and production of Δ¹-dehydrocortisone acetate 2 g. of compound IV are introduced into 8 cc. of redistilled collidine. A nitrogen current is passed through the solution, and 6 cc. of collidine are distilled, while stirring, within a period of about ten minutes (B.P. 165° C.). The residue is allowed to cool and is taken up with 20 cc. of ice-water, admixed with 6 cc. of concentrated hydrochloric acid. The precipitate thus formed is separated and washed in water until free of chlorine ions. It is again separated and dried at 40° C. The product obtained in this manner contains 58% of Δ¹-dehydrocortisone acetate, as determined by U.V. spectrographic analysis (238 mμ). It is isolated chromatographically over alumina. The resulting product has the same characteristics as a standard sample.

It will be obvious, from the foregoing examples, that it is possible to use different reaction times or reaction temperatures, change the acyl radical in the 21-position, or use a 17-acetate derivative in lieu of the foregoing 17α-hydroxylated compound without exceeding the scope of the invention. In the last named instance, free Δ¹-dehydrocortisone is obtained as the result of a simultaneous saponification of the two acetoxy groups in the 17- and the 21-position. Moreover, aside from collidine, other teritary bases such as methyl-ethyl pyridine or dinitro phenyl hydrazone may be used in debromohydrating 2,4-dibromo 17α-hydroxy 21-aceto pregnane 3,11,20-trione to Δ¹-dehydrocortisone acetate.

We claim:

1. The method of producing a Δ¹-dehydrocortisone, compound, which comprises brominating in dioxane as the reaction medium a member selected from the group consisting of 3α,17α-dihydroxy 21-acyloxy pregnane 11,20-dione, 17α-hydroxy 21-acyloxy pregnane 3,11,20-trione, 4-bromo 17α-hydroxy 21-acyloxy pregnane 3,11,20-trione and the 17α-acyloxy derivatives thereof, and dehydrobrominating the resulting 2,4-dibromo derivative by heating with a tertiary base.

2. The method of producing Δ¹-dehydrocortisone acetate, which comprises dissolving 4-bromo 17α-hydroxy 21-acetoxy pregnane 3,11,20-trione in hot dioxane, cooling to about room temperature, adding a solution of anhydrous hydrobromic acid in acetic acid and an about 10% bromine solution in acetic acid, precipitating 2,4-dibromo 17α-hydroxy 21-acetoxy pregnane 3,11,20-trione by adding water, separating and purifying said 2,4-dibromo derivative, dissolving said 2,4-dibromo derivative in collidine, heating while passing a nitrogen stream through the solution, cooling to about 0° C., precipitating by acidifying with a mineral acid and separating, drying and purifying the precipitate.

3. The method of producing Δ¹-dehydrocortisone acetate, which comprises dissolving 17α-hydroxy 21-acetoxy pregnane 3,11,20-trione in dioxane at room temperature, adding a mixture of bromine and acetic acid to the solution, precipitating 2,4-dibromo 17α-hydroxy 21-acetoxy pregnane 3,11,20-trione by adding water, drying the precipitate, making it into a paste with 50% dioxane, washing with water, drying and purifying the resulting crystalline product, and dehydrobrominating by heating in methylethyl pyridine.

4. The method of producing $\Delta^1$-dehydrocortisone acetate, which comprises pasting 3α,17α-dihydroxy 21-acetoxy pregnane 11,20-dione with dioxane, adding acetic acid, N-bromo succinimide and some distilled water, heating for about 25 minutes to 60° C., adding an excess of dioxane, cooling to about room temperature, treating with bromide dissolved in acetic acid, adding water, cooling and stirring, separating, drying and purifying precipitated 2,4-dibromo 17α-hydroxy 21-acetoxy pregnane 3,11,20-trione, and dehydrobrominating by heating in dinitrophenyl hydrazone.

5. The method according to claim 4, wherein, after adding an excess of dioxane and cooling, the solution is treated first with anhydrous hydrobromic acid dissolved in acetic acid, and then with N-bromo-succinimide, followed by precipitating, separating and purifying the resulting $\Delta^1$-dehydrocortisone acetate.

6. The method of producing $\Delta^1$-dehydrocortisone, which comprises brominating in dioxane as the reaction medium 4-bromo 17α-diacetoxy pregnane 3,11,20-trione, dehydrobrominating the resulting 2,4-dibromo derivative by heating with collidine, and saponifying the two acetoxy groups of said derivative.

References Cited in the file of this patent

UNITED STATES PATENTS

| | | |
|---|---|---|
| 2,579,479 | Djerassi | Dec. 25, 1951 |
| 2,703,805 | Rosenkranz | Mar. 8, 1955 |
| 2,734,899 | Leigh | Feb. 14, 1956 |
| 2,768,189 | Nomine | Oct. 23, 1956 |
| 2,783,226 | Gould et al. | Feb. 26, 1957 |
| 2,852,539 | Day et al. | Sept. 16, 1958 |